(12) United States Patent
Li et al.

(10) Patent No.: US 10,848,193 B2
(45) Date of Patent: Nov. 24, 2020

(54) METHOD AND SYSTEM FOR REDUCING RADIATION DAMAGE FROM MOBILE TERMINALS

(71) Applicant: JRD Communication Inc., Shenzhen (CN)

(72) Inventors: Yubiao Li, Shenzhen (CN); Wen Wang, Shenzhen (CN)

(73) Assignee: JRD Communication Inc., Shenzhen (CN)

( * ) Notice: Subject to any disclaimer, the term of this patent is extended or adjusted under 35 U.S.C. 154(b) by 0 days.

(21) Appl. No.: 16/334,376

(22) PCT Filed: Aug. 3, 2017

(86) PCT No.: PCT/CN2017/095741
§ 371 (c)(1),
(2) Date: Mar. 19, 2019

(87) PCT Pub. No.: WO2018/054175
PCT Pub. Date: Mar. 29, 2018

(65) Prior Publication Data
US 2020/0127693 A1    Apr. 23, 2020

(30) Foreign Application Priority Data
Sep. 21, 2016   (CN) .......................... 2016 1 0837247

(51) Int. Cl.
*H04M 1/00*        (2006.01)
*H04B 1/3827*      (2015.01)
(Continued)

(52) U.S. Cl.
CPC .......... *H04B 1/3838* (2013.01); *H01Q 1/245* (2013.01); *H04B 1/3888* (2013.01); *H04M 1/72577* (2013.01)

(58) Field of Classification Search
CPC .............. H04B 1/3838; H04B 1/3888; H04M 1/72577; H01Q 1/245
(Continued)

(56) References Cited

U.S. PATENT DOCUMENTS 7,308,283 B2 * 12/2007 Ogawa ................. H04B 7/0802
                                                              455/550.1
7,489,662 B2 *  2/2009 Hosomi ............... H04B 7/0805
                                                              370/332
(Continued)

FOREIGN PATENT DOCUMENTS

CN         102263861 A       11/2011
CN         104244291 A       12/2014
(Continued)

*Primary Examiner* — April G Gonzales
(74) *Attorney, Agent, or Firm* — Mark M. Friedman

(57) ABSTRACT

A method and a system for reducing radiation damage from a mobile terminal are provided. The method includes the following steps: responsive to the mobile terminal being in a call answering state, switching a main transceiver path of the mobile terminal to an upper antenna; and responsive to a receiver of the mobile terminal is in a working state, reducing a radio frequency transmit power of the upper antenna of the mobile terminal. When determining that the user is in a call while being close to the mobile terminal and that the main transceiver path is switched to the upper antenna, the present disclosure reduces the radio frequency transmit power of the upper antenna, of the mobile terminal by a radio frequency chip, thereby reducing an SAR value so as to prevent the radiation of the mobile terminal from harming the user.

10 Claims, 1 Drawing Sheet

(51) Int. Cl.
*H01Q 1/24* (2006.01)
*H04B 1/3888* (2015.01)
*H04M 1/725* (2006.01)

(58) Field of Classification Search
USPC .................................................. 455/575.5
See application file for complete search history.

(56) References Cited

U.S. PATENT DOCUMENTS

| | | | | |
|---|---|---|---|---|
| 7,869,957 | B2* | 1/2011 | Palsson | G16B 5/00 |
| | | | | 702/19 |
| 8,515,496 | B2* | 8/2013 | Cheng | H04M 1/72569 |
| | | | | 455/562.1 |
| 8,831,532 | B2* | 9/2014 | Nukala | H04W 52/265 |
| | | | | 455/67.14 |
| 9,070,974 | B2* | 6/2015 | Hu | H04W 88/06 |
| 9,231,302 | B2* | 1/2016 | He | H04W 24/02 |
| 9,287,953 | B2* | 3/2016 | Ngai | H04B 1/44 |
| 9,287,954 | B2* | 3/2016 | Ramkumar | H04B 7/0608 |
| 9,680,219 | B2* | 6/2017 | Filipovic | H01Q 3/24 |
| 9,871,545 | B2* | 1/2018 | Khawand | H04B 1/3838 |
| 9,923,610 | B2* | 3/2018 | Sandhu | H04W 28/0268 |
| 10,425,137 | B2 | 9/2019 | Hu et al. | |
| 2004/0147289 | A1* | 7/2004 | Paljug | H04L 1/0061 |
| | | | | 455/562.1 |
| 2011/0028106 | A1* | 2/2011 | Lee | H04B 7/0805 |
| | | | | 455/101 |
| 2011/0164697 | A1* | 7/2011 | Liao | H04L 1/0625 |
| | | | | 375/260 |
| 2012/0129466 | A1* | 5/2012 | Chiang | H04B 17/336 |
| | | | | 455/67.13 |
| 2013/0156080 | A1* | 6/2013 | Cheng | H01Q 21/28 |
| | | | | 375/222 |
| 2014/0357313 | A1* | 12/2014 | Mercer | H04B 17/102 |
| | | | | 455/552.1 |
| 2015/0234077 | A1* | 8/2015 | Komulainen | G01V 3/08 |
| | | | | 324/629 |
| 2015/0288074 | A1* | 10/2015 | Harper | H01Q 1/24 |
| | | | | 343/833 |

FOREIGN PATENT DOCUMENTS

| | | |
|---|---|---|
| CN | 104917539 A | 9/2015 |
| CN | 105721716 A | 6/2016 |
| CN | 105939417 A | 9/2016 |
| CN | 106301441 A | 1/2017 |
| JP | 2006311449 A | 11/2006 |
| WO | 2013090716 A1 | 6/2013 |
| WO | 2013184535 A2 | 12/2013 |
| WO | 2014066540 A1 | 5/2014 |
| WO | 2016089714 A1 | 6/2016 |

* cited by examiner

METHOD AND SYSTEM FOR REDUCING RADIATION DAMAGE FROM MOBILE TERMINALS

CROSS REFERENCE TO RELATED APPLICATIONS

This application, is a U.S. National Phase application submitted under 35 U.S.C. § 371 of Patent Cooperation Treaty Application serial No. PCT/CN2017/095741, filed on Aug. 3, 2017, which claims the priority of China Patent Application serial No. 201610837247.8, filed on Sep. 21, 2016, the disclosures of which are incorporated herein by reference in their entirety.

FIELD OF INVENTION

The present invention relates to field of mobile terminals, and more particularly to a method and a system for reducing radiation damage from mobile terminals.

BACKGROUND OF INVENTION

Antenna design of traditional non-all-metal 4G mobile phones uses a lower antenna as a main transceiver antenna and an upper antenna as a diversity receiving antenna. The all-metal 4G mobile phones adopt a slot antenna design scheme, but this antenna design scheme has a drawback. That is, when user's left or right hand holds the slot of lower antenna, performance of lower antenna will decrease sharply, which may cause serious adverse effects of voice drop or network drop.

In order to solve the above drawbacks, the all-metal mobile phone introduces transmit antenna select (TAS) technology. Specifically, when performance of lower antenna decreases to a certain limit, the transmit antenna is switched (the default main transceiver path is in the lower antenna and diversity receive path is in the upper antenna) by a TAS algorithm (for example, when transmit power of mobile phone is 15 dbm, receiving sensitivity of working antenna is 6 dbm worse than the other antenna, then a TAS switching occurred). An internal processor of mobile phone controls double pole double throw (DPDT) switch by TAS algorithm, to implement the function that main transceiver path is switched to the upper antenna and the diversity receiving path is switched to the lower antenna.

However, TAS technology has brought some disadvantages to users. When main transceiver path is switched to the upper antenna by TAS technology, the radiation specific absorption rate (SAR) value of the upper antenna to the user's head may exceed a standard value, thereby endangering health of users.

Therefore, the prior art has yet to be improved and developed.

SUMMARY OF INVENTION

In view of the above deficiencies of the prior art, the object of the present invention is providing a method and a system for reducing radiation damage from a mobile terminal. The present invention intends to solve the problem that smart terminal may easily cause the radiation specific absorption rate (SAR) value of antenna to the user's head exceed standard value, thereby endangering user's health, when main transceiver path is switched to upper antenna during a call.

The technical solution of the present invention is as follows:

A method for reducing radiation damage from a mobile terminal, comprising steps of:

A, when a mobile terminal is in a call answering state, detecting whether a main transceiver path of the mobile terminal is switched to an upper antenna; if yes, proceeding to step B;

B detecting whether a receiver of the mobile terminal is in a working state, if yes, proceeding to step C;

C, reducing a radio frequency transmit power of the upper antenna of the mobile terminal, so as to reduce a radiation damage from the mobile terminal to a user.

Further, the method for reducing radiation damage from a mobile terminal, wherein the step A comprises:

A1, when the mobile terminal is in the call answering state, detecting an electrical signal of the upper antenna and a lower antenna by a central processing unit, and determining whether the main transceiver path is switched to the upper antenna according to a detecting result;

A2, when a level of the electrical signal of the upper antenna is higher than a level of the electrical signal of the lower antenna, then determining that the main transceiver path is switched to the upper antenna, and proceeding to step B;

A3, when the level of the electrical signal of the upper antenna is lower than the level of the electrical signal of the lower antenna, then determining that the main transceiver path is connected to the lower antenna, and ending process.

Further, the method for reducing radiation damage from a mobile terminal, wherein the step B comprises:

B1, detecting whether an open receiver working statement appears in a hardware abstraction layer (HAL layer) code of the mobile terminal, determining whether the receiver of the mobile terminal is in the working state according to a detecting result;

B2, when the open receiver working statement appears in the HAL layer code of the mobile terminal, then determining that the receiver of the mobile terminal is in the working state, and proceeding to step C;

B3, when the open receiver working statement does not appear in the HAL layer code of the mobile terminal, then determining that the receiver of the mobile terminal is in a non-working state, and ending process.

Further, the method for reducing radiation damage from a mobile terminal, wherein the step C comprises:

C1, sending a power reduction instruction to a shared memory by the mobile terminal;

C2, using a radio frequency chip to reduce a radio frequency transmit power of the upper antenna of the mobile terminal by calling the power reduction instruction in the shared memory, thereby reducing the radiation damage from the mobile terminal to the user.

Further, the method for reducing radiation damage from a mobile terminal, wherein the mobile terminal is a smartphone.

A system for reducing radiation damage from a mobile terminal, comprising:

a first detecting module for detecting whether a main transceiver path of a mobile terminal is switched to an upper antenna when the mobile terminal is in a call answering state, and if yes, enter a second detecting module;

a second detecting module for detecting whether a receiver of the mobile terminal is in a working state, and if yes, enter a RF transmitting module;

a RF transmitting, module for reducing a radio frequency transmit power of the upper antenna of the mobile terminal, thereby reducing the radiation damage from the mobile terminal to the user.

Further, the system for reducing radiation damage from a mobile terminal, wherein the first detecting module comprises:

a first determining unit for detecting an electrical signal of the upper antenna and a lower antenna by a central processing unit, when the mobile terminal is in the call answering state, and determine whether the main transceiver path is switched to the upper antenna according to a detecting result;

a first determining unit for determining that the main transceiver path is, switched to the upper antenna, when a level of the electrical signal of the upper antenna is higher than a level of the electrical signal of the lower antenna, and enter the second detecting module;

a second determining unit for determining that the main transceiver path is connected to the lower antenna, when the level of the electrical signal of the upper antenna is lower than the level of the electrical signal of the lower antenna, and end process.

Further, the system for reducing radiation damage from a mobile terminal, wherein the second detecting module comprises:

a second determining unit for detecting whether an open receiver working statement appears in a hardware abstraction layer (HAL layer) code of the mobile terminal, and determine whether the receiver of the mobile terminal is in the working state according to a detecting result;

a third determining unit for determining that the receiver of the mobile terminal is in the working state, when the open receiver working statement appears in the HAL layer code of the mobile terminal, and enter the RF transmitting, module;

a fourth determining unit for determining that the receiver of the mobile terminal is in a non-working state, when the open receiver working statement does not appear in the HAL layer code of the mobile terminal, and end process.

Further, the system for reducing radiation damage from a mobile terminal, wherein the RF transmitting module comprises:

an instruction sending unit for sending a power reduction instruction to a shared memory by the mobile terminal;

a reduce transmit power unit for using a radio frequency chip to reduce a radio frequency transmit power of the upper antenna of the mobile terminal by calling the power reduction instruction in the shared memory, thereby reducing the radiation damage from the mobile terminal to the user.

Further, the system for reducing radiation damage from a mobile terminal, wherein the mobile terminal is a smartphone.

Beneficial effects: the method and the system for reducing radiation damage from a mobile terminal provided by the present invention can determine whether the mobile terminal is close to the user's head and is in a call answering state, and whether the main transceiver path is switched to the upper antenna. When determining that the user is in a call while being close to the mobile terminal and that the main transceiver path is switched to the upper antenna, the present invention reduces the radio frequency transmit power of the upper antenna of the mobile terminal by the radio frequency chip, thereby reducing an SAR value so as to prevent the radiation of the mobile terminal from harming the user.

DETAILED DESCRIPTION OF PREFERRED EMBODIMENTS

The present invention will be further described in detail below with reference to the accompanying drawings and embodiments.

The present invention provides method and a system for reducing radiation damage from a mobile terminal, for the purposes of the present invention, technical solutions and advantages clearer, explicit, the following detailed description of the present invention further. It should be understood that the specific embodiments described herein are only intended to illustrate the present invention and are not intended to limit the present invention.

Figure 1:
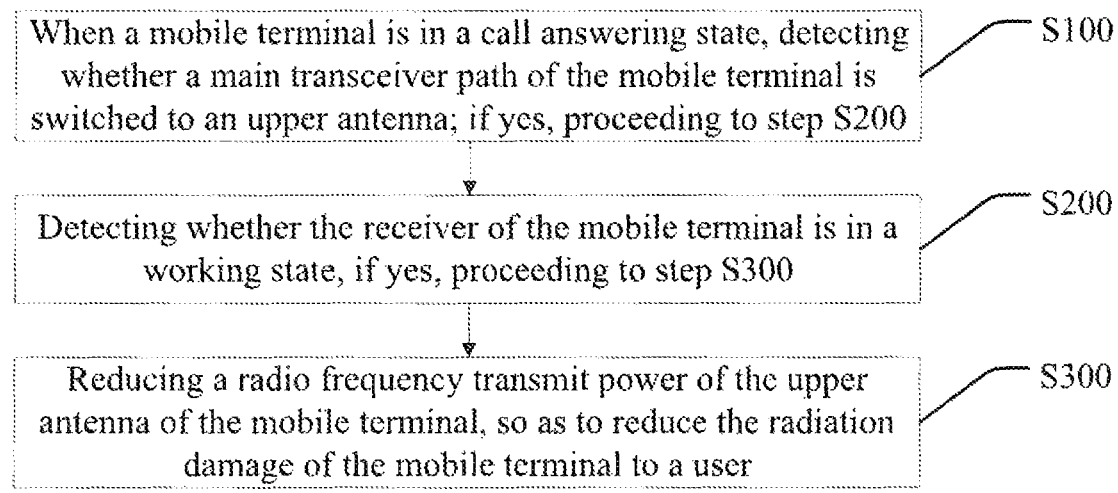
FIG. 1 is a flow chart of a preferred embodiment of a method for reducing radiation damage from a mobile terminal according to the present invention.

Please refer to FIG. 1. FIG. 1 is a method for reducing radiation damage from a mobile terminal, wherein as shown in FIG. 1, comprising steps of:

S100, when a mobile terminal is in a call answering state, detecting whether a main transceiver path of the mobile terminal is switched to an upper antenna; if yes, proceeding to step S200;

S200, detecting whether a receiver of the mobile terminal Is in a working state if yes, proceeding to step S300:

S300, reducing a radio frequency transmit power of the upper antenna of the mobile terminal, so as to reduce a radiation damage from the mobile terminal to a user.

In the embodiment of the present invention, when the structure of a mobile phone is determined, the specific absorption rate (SAR) value is directly related to the maximum transmit power total radiated power (TRP) of the antenna. The lower of the TRP, the lower of the SAR. In general, users receive more radiation when they are close to the mobile phone during a call, but the existing mobile phone cannot reduce the SAR value of the mobile phone when users are close to the mobile phone, thereby reducing the radiation.

Therefore, the present invention provides a method for reducing radiation damage from a mobile terminal, by determining whether the mobile terminal is dose to the user's head and is in a call answering state, and whether the main transceiver path is switched to the upper antenna. When determining that the user is in a call while being close to the mobile terminal and that the main transceiver path is switched to the upper antenna, the present invention reduces the radio frequency transmit power of the upper antenna of the mobile terminal by a radio frequency chip, thereby reducing the SAR value so as to prevent the radiation of the mobile terminal from harming the user.

In other words, the method of the present invention is responsive to the mobile terminal being in a call answering state, switching a main transceiver path of the mobile terminal to an upper antenna, and responsive to a receiver of the mobile terminal is in a working state, reducing a radio frequency transmit power of the upper antenna of the mobile terminal.

Further, in the present invention, the step S100 specifically includes:

S101, when the mobile terminal is in the call answering state, detecting an electrical signal of the upper antenna and a lower antenna by a central processing unit, and determining whether the main transceiver path is switched to the upper antenna according to a detecting result.

Specifically, the present invention first detects whether the current mobile terminal is in the call answering state by using an underlying application, for example, reporting the status of the current mobile terminal by software code TelecomManager and ConnectivityManager TYPE_MOBILE.

Specifically, when the code TelecomManager; isInCall( ) is detected, then determining that the mobile terminal is in a state of receiving a call.

When the code ConnectivityManager manager=(ConnedivityManager) getSysternService(Context.CONNECTIVITY_SERVICE) is detected, determining that the mobile terminal is in a data transmission state.

Further, when the mobile terminal is in the call answering state, detecting the electrical signal of the upper antenna and the lower antenna by the central processing unit, and determining whether the main transceiver path is switched to the upper antenna according to the detecting result. Specifically, the internal processor of the mobile terminal controls double pole double throw (DPDT) switch by transmit antenna select (TAS) technology algorithm, so as to implement the main transceiver primary transmit & receive main transceiver path (PRX) switch to the upper antenna.

S102, when a level of the electrical, signal of the upper antenna is higher than a level of the electrical signal of the lower antenna, then determining that the main transceiver path is switched to the upper antenna, and proceeding to step 200.

Specifically, when the level of the electrical signal of the upper antenna is higher than the level of the electrical signal of the lower antenna, it means that the main transceiver path connects with the upper antenna and the diversity receiving path connects with the lower antenna, then proceeding to step 200.

S103, when the level of the electrical signal of the upper antenna is lower than the level of the electrical signal of the lower antenna, then determining that the main transceiver path is connected to the lower antenna, and ending process.

Specifically, when the level of the electrical signal of the upper antenna is lower than the level of the electrical signal of the lower antenna, it means that the main transceiver path connects with the lower antenna and the diversity receiving path connects with the upper antenna, then ending process.

Further, in the present invention, the step S200 specifically includes:

S201, detecting whether an open receiver working statement appears in a hardware abstraction layer (HAL layer) code of the mobile terminal, determining whether the receiver of the mobile terminal is in the working state according, to a detecting result.

Specifically, the embodiment of the present invention determines whether the receiver of the mobile terminal is in the working state by detecting whether the HAL layer of the mobile terminal has the open receiver working statement. In this embodiment, the receiver is an earpiece.

S202, when the open receiver working statement appears in the HAL layer code of the mobile terminal, then determining that the receiver of the mobile terminal is in the working state, and proceeding to step S300.

S203, when the open receiver working statement does not appear in the HAL layer code of the mobile terminal, then determining that the receiver of the mobile terminal is in a nonworking state, and ending process.

The above detection method can quickly and accurately determine whether the receiver of the mobile terminal is in the working state.

Further, in the present invention, the step S300 specifically includes:

S301, sending a power reduction instruction to a shared memory by the mobile terminal.

Specifically, the shared memory refers to a large-capacity memory that can be accessed by a central processing unit (CPU). Since the CPU needs to access the memory quickly, it is necessary to cache the memory. When determining that the mobile terminal is in the call answering state, the main transceiver path is switched to the upper antenna, and the receiver is in the working state by the detecting result of the above step S100 and S200, at this point the mobile terminal will send the power reduction instruction to the shared memory.

S302, using a radio frequency chip to reduce a radio frequency transmit power of the upper antenna of the mobile terminal by calling the power reduction instruction in the shared memory, thereby reducing the radiation damage from the mobile terminal to the user.

Specifically, in the mobile terminal, the radio frequency chip is mainly responsible for functions of radio frequency transceiver, power synthesis, and power amplification. For example, when the mobile terminal is close to the user's head and is in a call, and the main transceiver path is switched to the upper antenna, if the radio frequency transmit power of the radio frequency chip is still 33 dBm, the SAR value is about 1.6 W/kg (1 g), at this time the mobile terminal will generate a larger radiation damage to the user's head. Therefore, the present invention determines that when the mobile terminal is close to the user's head and is in a call, and the main transceiver path is switched to the upper antenna, then the power reduction instruction in the shared memory is called by the radio frequency chip to reduce the upper antenna of radio frequency transmit power of the mobile terminal, thereby reducing the radiation damage from the mobile terminal to the user. Further, the radio frequency transmit power can be reduced to 30 dBm, and the SAR value is about 1.3 W/kg (1 g), at this time the mobile terminal will not cause radiation damage to the user's head.

Of course, you can't blindly pursue the low SAR value and reduce the radio frequency transmit power. Because the radio frequency transmit power value is too low, it will affect the handset answering performance.

Further, in the present invention, the mobile terminal is a smart phone.

Figure 2:
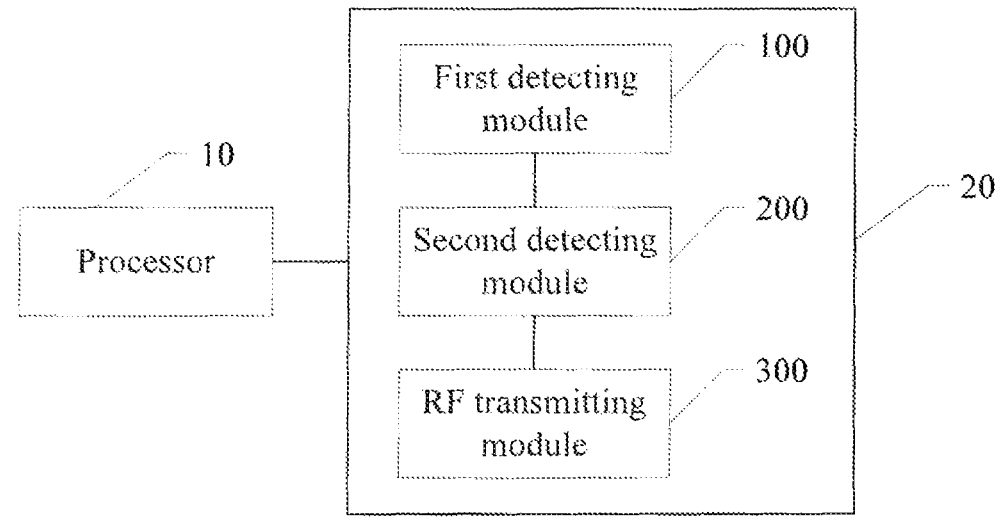
FIG. 2 is a structural block diagram of a preferred embodiment of a system for reducing radiation damage from a mobile terminal according to the present invention.

Based on the above method, the present invention also provides a system for reducing radiation damage from a mobile terminal, as shown in FIG. 2, which includes:

A processor 10, a memory 20 connected with the processor, and one or more applications, wherein the one or more applications are stored in the memory and configured to be executed by the processors the one or more applications comprises:

A first detecting module 100 for detecting whether a main transceiver path of a mobile terminal is switched to an upper antenna when the mobile terminal is in a call answering state, and if yes, enter a second detecting module 200.

A second detecting module 200 for detecting whether a receiver of the mobile terminal is in a working state, and if yes, enter a RF transmitting module 300.

A RF transmitting module 300 for reducing a radio frequency transmit power of the upper antenna of the mobile terminal, thereby reducing the radiation damage from the mobile terminal to the user.

Further, the system for reducing radiation damage from a mobile terminal wherein the first detecting module 100 specifically includes:

A first determining unit for detecting an electrical signal of the upper antenna and a lower antenna by a central processing unit, when the mobile terminal is in the call answering state, and determine whether the main transceiver path is switched to the upper antenna according to a detecting result.

A first decision unit for determining that the main transceiver path is switched to the upper antenna, when a level of the electrical signal of the upper antenna is higher than a level of the electrical signal of the lower antenna, and enter the second detecting module.

A second decision unit for determining that the main transceiver path is connected to the lower antenna, when the level of the electrical signal of the upper antenna is lower than the level of the electrical signal of the lower antenna, and end process.

Further, the system for reducing radiation damage from a mobile terminal, wherein the second detecting module 200 specifically includes:

A second determining unit for detecting whether an open receiver working statement appears in a hardware abstraction layer (HAL layer) code of the mobile terminal, and determine whether the receiver of the mobile terminal is in the working state according to a detecting result.

A third decision unit for determining that the receiver of the mobile terminal is in the working state, when the open receiver working statement appears in the HAL layer code of the mobile terminal, and enter the RF transmitting module.

A fourth decision unit for determining that the receiver of the mobile terminal is in a non-working state, when the open receiver working statement does not appear in the HAL layer code of the mobile terminal, and end process.

Further, the system for reducing radiation damage from a mobile terminal, wherein the RF transmitting module 300 specifically includes:

An instruction sending unit for sending a power reduction instruction to a shared memory by the mobile terminal.

A reduce transmit power unit for using a radio frequency chip to reduce a radio frequency transmit power of the upper antenna of the mobile terminal by calling the power reduction instruction in the shared memory, thereby reducing the radiation damage from the mobile terminal to the user.

Further, the system for reducing radiation damage from a mobile terminal, wherein the mobile terminal is a smartphone.

In summary, the method and the system for reducing radiation damage from a mobile terminal provided by the present invention can determine, whether the mobile terminal is close to the user's head and is in a call answering state, and whether the main transceiver path is switched to the upper antenna. When determining that the user is in a call while being close to the mobile terminal and that the main transceiver path is switched to the upper antenna, the present invention reduces the radio frequency transmit power of the upper antenna of the mobile terminal by the radio frequency chip, thereby reducing an SAR value so as to prevent the radiation of the mobile terminal from harming the user.

It should be appreciated that the present invention is applied is not limited to the above-described example, those of ordinary skill in the art, can be modified or converted according to the above description, all such modifications and variations shall fall within the appended claims of the invention protected range.

What is claimed is:

1. A method for reducing radiation damage from a mobile terminal, comprising steps of:
   responsive to the mobile terminal being in a call answering state, switching a main transceiver path of the mobile terminal to an upper antenna; and
   responsive to a receiver of the mobile terminal is in a working state, reducing a radio frequency transmit power of the upper antenna of the mobile terminal;
   wherein responsive to a receiver of the mobile terminal is in a working state, reducing a radio frequency transmit power of the upper antenna of the mobile terminal comprises:
   sending a power reduction instruction to a shared memory of the mobile terminal by the mobile terminal; and
   using a radio frequency chip to of the mobile terminal to reduce a radio frequency transmit power of the upper antenna of the mobile terminal by calling the power reduction instruction in the shared memory, thereby reducing the radiation damage from the mobile terminal to the user.

2. The method for reducing radiation damage from a mobile terminal according to claim 1, wherein responsive to the mobile terminal being in a call answering state, switching a main transceiver path of the mobile terminal to an upper antenna comprises:
   when the mobile terminal is in the call answering state, detecting an electrical signal of the upper antenna and a lower antenna by a central processing unit of the mobile terminal, and determining whether the main transceiver path is switched to the upper antenna;
   when a level of the electrical signal of the upper antenna is higher than a level of the electrical signal of the lower antenna, then determining that the main transceiver path is switched to the upper antenna; and
   when the level of the electrical signal of the upper antenna is lower than the level of the electrical signal of the lower antenna, then determining that the main transceiver path is connected to the lower antenna.

3. The method for reducing radiation damage from a mobile terminal according to claim 1, wherein the mobile terminal is a smartphone.

4. A method for reducing radiation damage from a mobile terminal, comprising steps of:
   responsive to the mobile terminal being in a call answering state, switching a main transceiver path of the mobile terminal to an upper antenna; and
   responsive to a receiver of the mobile terminal is in a working state, reducing a radio frequency transmit power of the upper antenna of the mobile terminal;
   wherein responsive to a receiver of the mobile terminal is in a working state, reducing a radio frequency transmit power of the upper antenna of the mobile terminal comprises:
   detecting whether an open receiver working statement appears in a hardware abstraction layer (HAL layer) code of the mobile terminal, determining whether the receiver of the mobile terminal is in the working state;
   when the open receiver working statement appears in the HAL layer code of the mobile terminal, then determining that the receiver of the mobile terminal is in the working state; and
   when the open receiver working statement does not appear in the HAL layer code of the mobile terminal, then determining that the receiver of the mobile terminal is in a non-working state.

5. A method for reducing radiation damage from a mobile terminal, comprising steps of:
   when a mobile terminal is in a call answering state, detecting an electrical signal of an upper antenna and a lower antenna by a central processing unit of the mobile terminal, and determining whether a main transceiver path is switched to the upper antenna;

when a level of the electrical signal of the upper antenna is higher than a level of the electrical signal of the lower antenna, then determining that the main transceiver path is switched to the upper antenna;

when the level of the electrical signal of the upper antenna is lower than the level of the electrical signal of the lower antenna, then determining that the main transceiver path is connected to the lower antenna;

detecting whether an open receiver working statement appears in a hardware abstraction layer (HAL layer) code of the mobile terminal, determining whether a receiver of the mobile terminal is in a working state;

when the open receiver working statement appears in the HAL layer code of the mobile terminal, then determining that the receiver of the mobile terminal is in the working state;

when the open receiver working statement does not appear in the HAL layer code of the mobile terminal, then determining that the receiver of the mobile terminal is in a non-working state;

sending a power reduction instruction to a shared memory of the mobile terminal by the mobile terminal; and using a radio frequency chip to reduce a radio frequency transmit power of the upper antenna of the mobile terminal by calling the power reduction instruction in the shared memory, thereby reducing a radiation damage from the mobile terminal to a user.

6. The method for reducing radiation damage from a mobile terminal according to claim 5, wherein the mobile terminal is a smartphone.

7. A system for reducing radiation damage from a mobile terminal, comprising:
   a processor;
   a memory connected with the processor, and
   one or more applications, wherein the one or more applications are stored in the memory and configured to be executed by the processors; the one or more applications comprises:
   a first detecting module for detecting whether a main transceiver path of a mobile terminal is switched to an upper antenna when the mobile terminal is in a call answering state;
   a second detecting module for detecting whether a receiver of the mobile terminal is in a working state, wherein the second detecting module comprises:
   a second determining unit for detecting whether an open receiver working statement appears in a hardware abstraction layer (HAL layer) code of the mobile terminal, and determine whether the receiver of the mobile terminal is in the working state;
   a third decision unit for determining that the receiver of the mobile terminal is in the working state, when the open receiver working statement appears in the HAL layer code of the mobile terminal; and
   a fourth decision unit for determining that the receiver of the mobile terminal is in a non-working state, when the open receiver working statement does not appear in the HAL layer code of the mobile terminal;
   a RF transmitting module for reducing a radio frequency transmit power of the upper antenna of the mobile terminal, thereby reducing the radiation damage from the mobile terminal to the user.

8. The system for reducing radiation damage from a mobile terminal according to claim 7, wherein the first detecting module comprises:
   a first determining unit for detecting an electrical signal of the upper antenna and a lower antenna by a central processing unit, when the mobile terminal is in the call answering state, and determine whether the main transceiver path is switched to the upper antenna;
   a first decision unit for determining that the main transceiver path is switched to the upper antenna, when a level of the electrical signal of the upper antenna is higher than a level of the electrical signal of the lower antenna; and
   a second decision unit for determining that the main transceiver path is connected to the lower antenna, when the level of the electrical signal of the upper antenna is lower than the level of the electrical signal of the lower antenna, and end process.

9. The system for reducing radiation damage from a mobile terminal according to claim 7, wherein the RF transmitting module comprises:
   an instruction sending unit for sending a power reduction instruction to a shared memory by the mobile terminal; and
   a reduce transmit power unit for using a radio frequency chip to reduce a radio frequency transmit power of the upper antenna of the mobile terminal by calling the power reduction instruction in the shared memory, thereby reducing the radiation damage from the mobile terminal to the user.

10. The system for reducing radiation damage from a mobile terminal according to claim 7, wherein the mobile terminal is a smartphone.

* * * * *